United States Patent [19]

Dohy et al.

[11] 4,246,151
[45] Jan. 20, 1981

[54] CATAPHORETICALLY DEPOSITABLE AQUEOUS COATING COMPOSITION, A METHOD FOR THE PREPARATION THEREOF AND A METHOD OF DEPOSITING THE COMPOSITION

[75] Inventors: Gilles Dohy, Chantilly, France; Hilde Kersten, Erlenbach; Gerhard Meyer, Obernburg, both of Fed. Rep. of Germany; Anton Toth, Creil; Jean P. Vollmer, Chantilly, both of France

[73] Assignee: Akzo N.V., Arnhem, Netherlands

[21] Appl. No.: 926,617

[22] Filed: Jul. 21, 1978

[30] Foreign Application Priority Data

Aug. 3, 1977 [NL] Netherlands .......................... 7708567

[51] Int. Cl.$^3$ ....................... C08L 63/08; C25D 13/06
[52] U.S. Cl. ..................... 260/29.2 TN; 260/29.2 EP; 204/181 C
[58] Field of Search ................ 260/29.2 TN, 29.2 EP; 204/181 C

[56] References Cited

U.S. PATENT DOCUMENTS

| | | | |
|---|---|---|---|
| 3,922,253 | 11/1975 | Jerabek et al. | 260/29.2 TN |
| 3,947,339 | 3/1976 | Jerabek et al. | 260/29.2 TN |
| 3,975,250 | 8/1976 | Marchetti et al. | 204/181 C |
| 3,984,299 | 10/1976 | Jerabek | 204/181 C |
| 4,093,569 | 6/1978 | Reischl et al. | 260/29.2 TN |
| 4,129,490 | 12/1978 | Schimmel | 260/29.2 TN |
| 4,182,833 | 1/1980 | Hicks | 204/181 C |

*Primary Examiner*—Allan Lieberman
*Attorney, Agent, or Firm*—Stevens, Davis, Miller & Mosher

[57] ABSTRACT

A catephoretically depositable aqueous coating composition is disclosed which is based on
(A) 100 parts by weight of an at least partially neutralized reaction product of an epoxy groups-containing compound and an amine and
(B) 5–50 parts by weight of an at least partially blocked polyisocyanate, in which composition the constituents A and B may be chemically combined, wherein the aminated epoxy compound is the reaction product of
(1) 40–90 parts by weight of an epoxidized (co)polymer, i.e. a homopolymer or copolymer, having an epoxy number of 50–400 of a (cyclo)alkadiene, i.e. alkadiene or cycloalkadiene, containing 4–12 carbon atoms, which (co)polymer has an average molecular weight of 400–12,000, and
(2) 60–10 parts by weight of a compound having 1–30 carbon atoms and having at least one primary or secondary amino group.

The invention also relates to a method for the preparation of said aqueous coating composition and to method of depositing same.

28 Claims, 1 Drawing Figure

CATAPHORETICALLY DEPOSITABLE AQUEOUS COATING COMPOSITION, A METHOD FOR THE PREPARATION THEREOF AND A METHOD OF DEPOSITING THE COMPOSITION

This invention relates to a cataphoretically depositable aqueous coating composition based on (A) 100 parts by weight of an at least partially neutralized reaction product of an epoxy groups-containing compound and an amine and (B) 5-50 parts by weight of an at least partially blocked polyisocyanate, in which composition the constituents A and B may be chemically combined.

A composition of the type indicated above is described in U.S. Patent No. 3,947,339, in which it is mentioned that the use of an amine having an unblocked primary amino group results in gelation or in the formation of a product with an increased molecular weight, with attendant loss of active primary amino groups. According to said U.S. specification this drawback may be obviated by using as amine a polyamine which besides a secondary amino group contains a primary amino group blocked by a ketimine group. The disadvantage, however, to it is that an additional blocking step is required then and reaction with the partially blocked isocyanate gives rise to the coating composition generally showing a tendency to undesirable gelation. Moreover, the French patent application No. 7,528,761 discloses a cationic electrocoating composition based on an animated epoxy resin, wherein the epoxy resin is, for example, a phenolic resin such as a Bisphenol A epoxy resin. At most 25% by weight of the epoxy resin may be replaced by an epoxy compound such as epoxidized 1,2-polybutadiene in order to plastify the phenolic resin. Consequently, said French patent application neither suggests nor teaches the use of the epoxy compound as the major epoxy derivative.

An object of the present invention is to provide a specific epoxy groups-containing compound which makes it possible to use any amino compound. Another object is to provide a coating composition which has a surprisingly excellent throwing power and a very good bath stability. Other advantages are the very high resistance to corrosion and remarkable flexibility of the baked coating. Moreover, the filmforming properties are superior to those of a composition based on some other epoxy resin.

The aqueous coating composition according to the invention is characterized in that the animated epoxy compound is the reaction product of (1) 40-90 parts by weight of an epoxidized (co)polymer having an epoxy number of 50-400 of a (cyclo)alkadiene containing 4-12 carbon atoms, which (co)polymer has an average molecular weight of 400-12,000, and (2) 60-10 parts by weight of a compound containing 1-30 carbon atoms and having at least one primary or secondary amino group.

According to the invention use may be made of any (co)polymer having an average molecular weight of 400-12,000 of a (cyclo)alkadiene containing 4-12 carbon atoms. By a (co)polymer of a (cyclo)alkadiene is to be understood here a homopolymer or a copolymer of one or more alkadienes and/or cycloalkadienes and a copolymer of one or more alkadienes and/or cycloalkadienes and one or more vinyl compounds. As examples of suitable (cyclo)alkadienes may be mentioned 1,3-butadiene, isoprene, chloroprene, 1,3-pentadiene, 1,4-pentadiene, 1,4-hexadiene, cyclopentadiene and dicyclopentadiene. As examples of suitable vinyl compounds may be mentioned styrene, α-methyl styrene, vinyl toluene, ethyl styrene, acrylonitrile, methacrylonitrile, cyclohexene, indene, methyl indene and ethyl indene. The homo- or copolymers may, if desired, contain terminal benzyl, hydroxy, mercapto, epoxy or carboxyl groups, for instance 1.2-2.5 of such groups per molecule. As very suitable polymers may be mentioned those that are built up from, for instance, 1,3-butadiene and/or 1,3-pentadiene, in combination, if desired, with styrene, acrylonitrile, methacrylonitrile and α-methyl styrene. As examples of other polymers may be mentioned petroleum resins based on cyclopentadiene, dicyclopentadiene and/or pentadiene. It is preferred that use should be made of a (co)polymer of a (cyclo)alkadiene having 4-12 carbon atoms and built up from 5-95% by weight of one or more (cyclo)alkadienes and 10-95% by weight of one or more vinyl compounds. Preference is also given to a homopolymer or copolymer of 1,3-butadiene and/or 1,3-pentadiene. The steric configuration of the polymer of 1,3-butadiene may vary. For instance, the polymer may have a high cis-1,4-content, a high vinyl content or a mixed form of different configurations. Use is made, more particularly, of butadiene polymers respectively having a cis-1,4-content of at least 60% or a vinyl content of at least 80% or a cis-1,4-content of 5-40%, a trans-1,4-content of 20-55%, and a vinyl content of 30-55%. The number average molecular weight is generally in the range of 400 to 12,000, and preferably in the range of 500 to 6,000. The homo- or copolymers to be used according to the invention are products known in themselves and can be prepared by known methods. These methods are known to the man skilled in the art and need not be further described here.

The (cyclo)alkadiene (co)polymer can be epoxidized in a known manner, for instance by using peracetic acid or hydrogen peroxide in solvents such as dichloroethane, acetone, toluene, xylene, or esters, for instance ethyl acetate, or acids such as formic acid or acetic acid. The polymer to be epoxidized is usually employed as a solution in, for instance, an acetic ester such as ethyl acetate. The reaction temperature is generally in the range of 60° to 100° C. The polydiene is generally epoxidized to an epoxy number of 50-400, and preferably 100-300. These values correspond to the presence of 0.9-7.2, and preferably of 1.8-5.4 epoxy groups per 1000 grammes of resin. The epoxy number indicates how many mg of KOH are required for the ring opening of the epoxy groups in 1 gramme of the epoxy groups-containing polymer. The epoxy number is determined by the reaction of the epoxy groups with perchloric acid with the use of cetyltrimethyl ammonium bromide in an acetic acid solution. The specific epoxidized (co)polymer of the alkadiene or cycloalkadiene containing 4-12 carbon atoms accordong to the invention is referred to hereinafter as epoxy polydiene.

According to the invention 40-90 parts by weight of the epoxy polydiene are subsequently reacted with 60-10 parts by weight of a compound containing 1-30 carbon atoms and having at least one primary or secondary amino group. It is preferred that use should be made of an amine having one or more amino groups which are exclusively primary. As examples of such amines may be mentioned monoamines such as methylamine, ethylamine, n-propylamine, isopropylamine, n-butylamine, 2-aminobutane, n-octylamine, n-decylamine, n-dodecylamine, n-tetradecylamine, n-octadecylamine; hydroxyamines such as monoethanolamine, 2-aminopropanol and 2-hydroxy-2-methyl propylamine, and diamines such as 1,2 diaminoethane, 1,2-diaminopropane, 1,3-diaminopropane, 1,4-diaminobutane, 1,5-diaminopentane, 1,6-diaminohexane, 1,10-diamino-4,7-dioxadecane, 1,12-diamino-4,9-dioxadodecane and 1,13-diamino-7-methyl-4,10-dioxatridecane. Use also may be made of amines having at least one primary amino group and at least one secondary amino group. As examples of such compounds may be mentioned diethylene triamine, triethylene tetramine, tetraethylene pentamine, tetrapropylene pentamine, pentaethylene hexamine, N,N-bis-(3-aminopropyl)ethylene diamine, (2-aminoethyl) aminopropylamine, 3-amino-1-methylaminopropane, 3-amino-1-cyclohexylaminopropane, 1-(2-aminopropyl) piperidine, 4-(3-aminopropyl) morpholine, 1-(2-aminoethyl) piperazine, N-(2-hydroxyethyl)ethylene diamine, 1-(2-hydroxyethyl) piperazine, 1,2-diaminocyclohexane, 1,4-diaminocyclohexane, 4,4'-diaminodicyclohexyl methane, 3,3'-dimethyl-4,4'-diaminodicyclohexyl methane and 2,2-bis-(4-aminocyclohexyl)propane. As examples of amines exclusively having secondary amino groups may be mentioned piperazine, dodecylmethylamine, didodecylamine, octadecylbutylamine, dioctadecylamine, diethanolamine, bis-(2-hydroxypropyl)amine, bis-(3-hydroxypropyl)amine, bis-(2-hydroxybutyl)amine, bis-(3-hydroxybutyl)amine, bis-(4-hydroxybutyl)amine and bis-(2-hydroxy-2-methylpropyl)amine. Also mixtures of 2 or more of the above-envisaged amines may be used. It is preferred that per 90-40 parts by weight of the epoxy polydiene 10-60 parts by weight of a mixture of amines should be used, of which 4-30 parts by weight are a primary or secondary fatty amine, at least one of the hydrocarbon groups of the fatty amine containing 8-26 carbon atoms and of which 6-30 parts by weight are a different amine. The presence of such an amount of a fatty amine in the coating composition provides a better adhesion thereof to non-pretreated metal surfaces and leads to improved flow of the coating composition.

The conversion of the epoxy groups of the epoxy polydiene with the amine(s) can be effected in a simple manner, for instance by adding the amine(s) to the epoxy compound(s), optionally in the presence of an organic solvent and generally at a temperature in the range of 60° to 220° C., and preferably at a temperature in the range of 80° to 200° C.

It is of advantage that in the reaction use is made of a catalyst, for instance a trialkyl tin halide of which the alkyl groups contain 1-20 carbon atoms, for instance trimethyl tin chloride, trimethyl tin bromide, triethyl tin chloride, tripropyl tin bromide and tributyl tin chloride; a quaternary ammonium compound, for instance trimethylbenzyl ammonium chloride, trimethylbenzyl ammonium hydroxide, trimethylpropyl ammonium iodide, trimethylbutyl ammonium bromide and trimethylstearyl ammonium chloride; a quaternary phosphonium compound, for instance a triphenylalkyl phosphonium chloride or a triphenylalkylaryl phosphonium chloride or the corresponding bromide, iodide or hydroxide thereof, the alkyl group having 1-20 carbon atoms. It is preferred that as catalyst there should be used an adduct of a Lewis acid such as borium trifluoride and a tert.amine such as dimethylbenzylamine, diethylbenzylamine, trimethylamine and triethylamine. Instead of borium trifluoride compounds such as zinc chloride, iron (III) chloride and antimony (III) chloride may be employed. The catalysts are used in amounts of generally 0.05-3% by weight, based on the total weight of the reactants.

If desired, the reaction product of the epoxy polydiene and the amino compound may be modified by the incorporation of relatively small amounts of compounds such as an alkylated or non-alkylated phenol containing 6-30 carbon atoms, a hydroxycompound and/or a thiol compound having 4-30 carbon atoms, a mono- or diepoxy compound having 2-220 carbon atoms and a saturated or unsaturated fatty acid having 8-30 carbon atoms. It is preferred that the reaction product should contain 5-65% by weight of the modifying agent. As examples of suitable alkylated or non-alkylated phenols having 6-30 carbon atoms may be mentioned phenol, o-cresol, m-cresol, p-cresol, p.tert.butyl phenol, propyl phenol, and bisphenols obtained by reacting a phenol, for instance Bisphenol-A and Bisphenol-F, with an aldehyde, for instance formaldehyde, or a ketone.

As examples of suitable hydroxy compounds and/or thiol compounds having 4-30 carbon atoms may be mentioned 1-hexanol, 2-ethylhexanol, 1-dodecanol, n-octylmercaptane, n-decyl mercaptane, n-dodecyl mercaptane and n-octadecyl mercaptane. The compounds may contain conjugated or non-conjugated ethylenically unsaturated C—C bonds. It is preferred that use should be made of a fatty alcohol having 12-22 carbon atoms and 1-4 ethylenically unsaturated C—C bonds, for instance octadecatrienol and hexadecatrienol.

As examples of suitable mono or diepoxy compounds containing 2-220 carbon atoms may be mentioned 1,2-epoxy decane, 1,2-epoxy dodecane, styrene oxide, glycidyl esters of unsaturated fatty acids and compounds having the general formula:

wherein n is a number in the range of 0 to 10. As example of suitable fatty acids may be mentioned nonane carboxylic acid, undecane carboxylic acid, stearic acid, linoleic acid, linolenic acid and synthetic fatty acids.

The incorporation of the modifying agent into the reaction product of the epoxy polydiene and the amino compound may be effected in any convenient manner, for instance during, before or after the reaction of the epoxy polydiene with the amino compound. Modification with an epoxy compound preferably takes place after the reaction of the epoxy polydiene with the amino ampound. The reaction temperature is generally in the range of from 50° to 160° C., the reaction pressure is not critical. There is generally no need to use an additional catalyst. An organic solvent such as acetone, methylethyl ketone, cyclohexanone, tetrahydrofuran, dioxane and methylglycol acetate may be present, if desired, but will generally not be required.

The above described binder is cross-linked in a known manner by means of an at least partially blocked polyisocyanate. The free isocyanate groups that may be present may previously be reacted with functional groups of the reaction product of the epoxy polydiene and amine.

As examples of suitable polyisocyanates may be mentioned aliphatic, cycloaliphatic or aromatic diisocyanates such as methylene diisocyanate, trimethylene diisocyanate, tetramethylene diisocyanate, hexamethylene diisocyanate, trimethyl hexamethylene diisocyanate, 1,2-propylene diisocyanate, 2,3-butylene diisocyanate, ω,ω-dipropyl ether diisocyanate, 1,2-cyclohexane diisocyanate, 1,4-cyclohexane diisocyanate, isophoron diisocyanate, dicyclohexylmethane-4,4'-diisocyanate, 3,3'-dimethyl-dicyclohexylmethane-4,4'-diisocyanate, xylylene diisocyanate, 1,5-dimethyl(2,4-ω-diisocyanatomethyl)-benzene, 1,5-dimethyl-(2,4-ω-diisocyanatoethyl)benzene, 1,3,5-triethyl-(2,4-ω-diisocyanatomethyl)benzene, 4,4'-diphenylmethane diisocyanate, 2,4-toluene diisocyanate, 2,6-toluene diisocyanate, naphthalene diisocyanate, dianisidine diisocyanate, 4,4'-diphenyl ether diisocyanate. Applicable are also higher functional polyisocyanates such as the adduct of 3 molecules of hexamethylene diisocyanate and 1 molecule of water (marketed by Bayer under the trade name Desmodur N), the adduct of 1 molecule of trimethylol propane and 3 molecules of toluene diisocyanate (marketed by Bayer under the trade name Desmodur L) and the adduct of 1 molecule of trimethylol propane and 3 molecules of isophoron diisocyanate, and compounds such as 1,3,5-triisocyanatobenzene and 2,4,6-triisocyanatotoluene.

As examples of suitable, known blocking agents for the polyisocyanate may be mentioned alcohols, phenols, lactams and oximes. Applicable alcohols, which may be aliphatic, cycloaliphatic or alkylaromatic, include propanol, 1-butanol, 2-butanol, isobutanol and pentanols. It is preferred that use should be made of tertiary alcohols such as tert.butanol, tert.amyl alcohol, 2-methyl-butene-3-ol-2, 2-methyl-butyne-3-ol-2, 3-methylpentyne-1-ol-3, 3,4-dimethyl-pentyne-1-ol-3. It is preferred that as novel blocking agent there should be used an alcohol such as diacetone alcohol. As examples of suitable phenols may be mentioned phenol, 2-chlorophenol, 3-chlorophenol, 4-chlorophenol, 2-nitrophenol and 4-nitrophenol. Examples of suitable lactams are ε-caprolactam, butyrolactam and 2-pyrrolidone. As example of applicable oximes may be mentioned ethylmethyl ketoxime. Still other blocking agents are: for example, compounds such as benzylmethacryloyl hydroxamate and allylmethacryloyl hydroxamate.

It is preferred that a bifunctional blocking agent should be used which besides the usual group contains a specific second functional group that causes the blocked polyisocyanate to be soluble in water, and which group is preferably a tertiary amino group or a quaternary ammonium group. As a result, the cross-linking agent is applied to the cathode simultaneously with the binder, so that uniform crosslinking and homogeneous film properties are obtained. As examples of suitable groups of preferable blocking agents may be mentioned amino alcohols, amido amines and phenols having a tertiary amino group. Amino alcohols may be represented by the following formula wherein $R_1$ and $R_2$ may be the same or different and represent an alkyl group having 1-6 carbon atoms, and X represents a hydrocarbon group having 2-16 carbon atoms. As suitable examples may be mentioned dimethyl-aminoethanol, diethylaminoethanol, dimethylaminopropanol, diethylaminopropanol and cyclic compounds such as 1-ethyl-2-hydroxyethyl piperazine.

Suitable amido amines having a tertiary amino group are of the general formula wherein $R_1$ and $R_2$ may be the same or different and represent an alkyl group having 1-5 carbon atoms, and $R_3$ is a hydrogen atom or a hydrocarbon group having 1-8 carbon atoms and n is a number in the range of 2 to 5. As examples of suitable amido amines may be mentioned N,N-dimethyl-aminoethylacetamide and N,N-dimethylaminopropylacetamide. Suitable amido amines having quaternary ammonium groups may be represented by the general formula wherein $R_1$ and $R_2$ may be the same or different and represent an alkyl group having 1-5 carbon atoms, X is a halogen atom and n is a number in the range of 1 to 4. These compounds may be obtained in a known manner, for instance by reacting an α-halacetic methylester with a primary-tertiary diamine such as 1,1-N-dimethylamino-ethylamine. As examples of suitable amido amines may be mentioned 4,4-N-dimethyl-2-on-cyclohexa-1,4-diazinium chloride and 4,4-N-diethyl-2-on-cyclohexa-1,4-diazinium chloride.

As examples of phenols having a tertiary amino group may be mentioned m-dimethylamino phenol and p-dimethylaminophenol. Still other suitable compounds are for example:
(a) N-containing heterocyclic compounds such as pyridine bases of the general formula wherein n is a number in the range of 0 to 3, for instance: 8-oxyquinoline;
(b) pyridine oximes of the general formula wherein R represents a hydrogen atom or an alkyl group having 1-3 carbon atoms;
(c) pyridinic amides of the general formula wherein R represents a hydrogen atom or an alkyl group having 1-3 carbon atoms.

Optionally, a partially blocked polyisocyanate, before being mixed with the aminated epoxy compound, may be reacted with a styrene-allyl alcohol copolymer having a hydroxyl content of 4–8% by weight (marketed by Monsanto under the trade name RI-100) or with a polymer of the monoglycidyl ether of Bisphenol-A.

The preparation of the at least partially blocked polyisocyanate can be effected in a known manner by reacting the polyisocyanate with the desired amount of blocking agent, in the presence or not of a suitable aprotic solvent under anhydrous conditions. Suitable reaction temperature are generally in the range of 0° to 130° C., and preferably in the range of 10° to 80° C. Optionally, use may be made of a catalyst, which may, for instance, be metallic sodium in the case where as blocking agent diacetone alcohol is used. Then the sodium may be used in an amount of, for instance, 0.01–0.1% by weight, calculated on the amount of the two reactants. The metallic sodium may entirely or partly be placed with a sodium alcoholate, such as sodium methylate or sodium ethylate.

All or part of the isocyanate groups of the polyisocyanate used as crosslinking agent may be in the blocked state. The entirely blocked polyisocyanate generally has an amine number in the range of 50 to 180. If the polyisocyanate is only partially crosslinked, then the free isocyanate groups are reacted with the aminated epoxy polydiene before being contacted with water. The reaction generally takes place in the presence of a water-miscible solvent which is inert to the partially blocked polyisocyanate. As examples of suitable solvents may be mentioned acetone, ethylmethyl ketone, cyclohexanone, methylglycol acetate, dimethyl ether of diethylene glycol, dimethyl ether of triethylene glycol, dioxane, tetrahydrofuran, dimethyl formamide, dimethyl acetamide, N-methyl pyrrolidone, dimethyl sulphoxide, diethyl sulphoxide, dimethyl sulphone, diethyl sulphone and sulpholan. The reaction is usually carried out at a temperature in the range of 20° to 150° C., and preferably in the range of 40° to 130° C. The reaction may be accelerated, if desired, by adding to the reaction solution 0.01–1% by weight of a suitable catalyst. As examples of suitable catalysts may be mentioned tributyl tin laurate, dibutyl tin oxide, tin acetyl acetonate, zinc octoate, zinc stearate and zinc acetyl acetonate. Upon completion of the reaction the solvent that may be present is generally removed from the solution.

In cross-linking the aminated epoxy polydiene with a polyisocyanate which may be partially blocked, if desired, use may be made, if required, of a catalyst to decrease the unblocking temperature of the polyisocyanate. Suitable catalysts are transition metal ions, such as those of titanium, vanadium, chromium, manganese, iron, cobalt, nickel, copper, zinc, tin, antimony and lead, and also the organic complexes thereof that are dispersable or not in water. Preferable transition metals are nickel, cobalt, lead, manganese, zinc, chromium, vanadium and iron. The catalysts may be used in the form of a salt of for instance acids such as formic acid, acetic acid, propionic acid and naphthenic acid, or hydrochloric acid, sulphuric acid, sulphurous acid and nitric acid. It is preferred that use should be made of transition metal compounds that are chemically combined with a complexforming acid such as citric acid, tartaric acid, nitrilotriacetic acid, ethylenediaminotetracetic acid or a compound such as ethylmethyl ketoxime, dimethyl glyoxime, $\alpha,\alpha'$-dipyridyl, 8-oxyquinoline, conversion products of salicyl aldehyde and monoamines or diamines, or a diketone, for instance diacetyl, benzyl, acetyl acetone and acetonyl acetone.

In order to render the aminated epoxy polydiene water-soluble, the amino groups present should at least partially be neutralized. This is generally done in a known manner with the aid of an (in)organic, complexing or non-complexing acid. As examples of suitable acids may be mentioned carbonic acid, boric acid, phosphoric acid, sulphuric acid, sulphurous acid, hydrochloric acid, formic acid, acetic acid, propionic acid, glycolic acid, thioglycolic acid, diglycolic acid, thiodiglycolic acid, dithiodiglycolic acid, lactic acid, thiopropionic acid, tartaric acid, malic acid, citric acid, nitrilotriacetic acid, ethylenediaminodiacetic acid, diethylenetriaminopentacetic acid. It is preferred that use should be made of mixtures of acids, for instance mixtures of at least 2 organic acids and at least 1 inorganic acid. A suitable mixture, for example, is one composed of 10–30% acetic acid, 20–50% tartaric acid, 10–30% phosphoric acid and 0–20% ethylenediaminotetracetic acid. Neutralization may be carried out stepwise, if desired. It is preferred that 10–100% of the amino groups present should be neutralized.

The preparation of the aqueous coating composition is carried out in a simple manner, for instance by adding the at least partially neutralized binder to soft water, the concentration level preferably being maintained at 40–70% by weight. Subsequently, the resulting solution is diluted with water to a concentration often used in practice of 1–25% by weight, and preferably 5–15% by weight.

The aqueous coating composition may contain the usual adjuvants ad additives, for instance: surface active compounds, sag-control agents, dispersing agents, antioxidants, dispersion stabilizers, pigments and dyes. As examples of suitable pigments may be mentioned iron oxide, lead oxide, strontium chromate, carbon black, titanium dioxide, talc, silica, barium sulphate, cadmium yellow, cadmium red and chrome yellow. As examples of other suitable additives may be mentioned polyamido amines having a number average molecular weight of 500–5000 and an amine number of 50–180, which may, if desired, have been brought into reaction with an isocyanate compound; polymers of the monoglycidyl ether of Bisphenol A, having a number average molecular weight of 600–10,000 and an amine number of 50–150; an optionally modified copolymer of styrene and allyl alcohol having a number average molecular weight of 500–3000 and an adduct of an aromatic bisepoxy compound and a secondary amine or secondary alkanolamine, having a number average molecular weight of 500–5000 and an amine number of 50–180.

The ready-for-use aqueous coating composition is brought into contact with an anode and the electrically conductive substrate to be coated, which acts as a cathode. The composition may be deposited on the cathode in the usual manner, for instance while applying a voltage of 1–800 V, and preferably 50–500 V, and an initial current density of 0.1–40 A/100 cm$^2$.

The substrate to be coated is usually of steel, aluminium, copper or a metal alloy, and may be pretreated, if desired, in the usual manner. Alternatively, the coating composition may be employed as dipping paint, without making use of electric current, in which case, however, the solids content of the composition is generally in the range of 30–60% by weight.

After the coating has been applied to the substrate, the latter is washed and dried in the usual manner and subsequently baked at a temperature in the range of, for instance, 90°–320° C., and preferably 100°–200° C. The baking time is dependent on the baking temperature and is in the range of about 1 minute to about 45 minutes.

Figure 1:
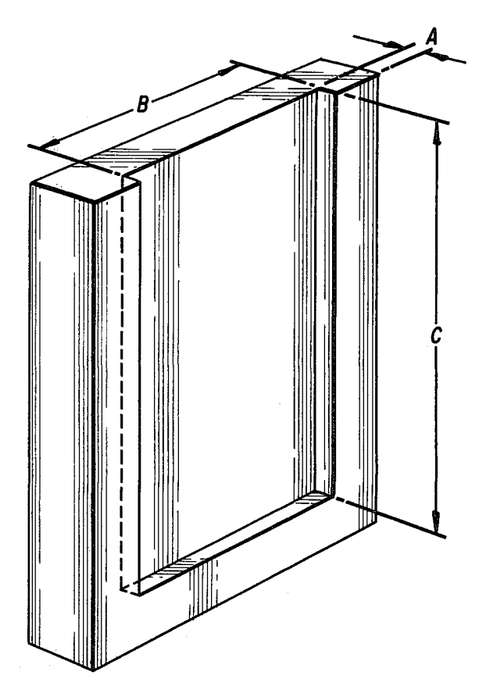

The invention is further described in the following non-limitative examples. In them the Persoz hardness is measured and expressed in seconds. The resistance to solvents is determined by rubbing a small lump of cotton wool saturated with methylethyl ketone up and down the coated surface. The number of times the lump of cotton is to be rubbed up and down the surface to completely remove the coating is recorded as a measure of the resistance to solvents. The resistance to corrosion in a salt spray test is measured by using a 5% solution of sodium chloride in water over a period of 240 hours or 360 hours. In the determination of the throwing power use is made of a small or a large cell of some synthetic material, which cell is attached to the cathode in such a way that only the upper part of the cel is open. The cell is shown in FIG. 1, the dimensions A, B and C of the small and the large cell being: 1 and 3 mm, 70 and 60 mm, and 135 and 240 mm, respectively. For the small cell the throwing power is to be even higher than for the large cell. During cataphoresis the electric field of force will progressively decrease toward the interior of the cell, and so will consequently the amount of coating composition deposited. The maximum throwing power (in mm) now indicates at what distance from the cell opening still part of the composition is deposited during cataphoresis. For the small cell the maximum throwing power, of course, never exceeds 135 mm, and for the large cell it will never be more than 240 mm. Not only the maximum throwing power but also the thickness to which the coating composition is deposited in the cell is of importance. A coating thickness of at least 10 μm after baking is in many cases required for a satisfactory resistance to corrosion, so that also the distance from the cell opening is determined at which the deposited coating composition still has a minimum layer thickness after baking of 10 μm. The distance thus determined is indicated with 10 μm-throwing power and is expressed in mm.

PREPARATION OF AMINATED EPOXY POLYDIENE

EXAMPLE A

Into a reactor containing 750 grammes of epoxidized 1,2-polybutadiene having an epoxy number of 118 there were charged 160 grammes of diethanolamine over a period of 30 minutes, in a nitrogen atmosphere and at a temperature of 100°–110° C. The unmodified polybutadiene had a vinyl content of 90%, a cis-1,4-content of 1% and a trans-1,4-content of 9%, the polybutadiene being epoxidized in a mixture of acetone and ethyl acetate at 70°–80° C. with the aid of peracetic acid. The amination lasted 6 hours at 190°–200° C. After cooling it was found that 37.2% of the amine had not retracted, so that the reaction product contained 0.58 free epoxy groups per 850 grammes of resin.

Example B

The same procedure was followed as in Example A, except that use was made of 250 grammes of 1,2-polybutadiene having an epoxy number of 140 and of 50 grammes of dimethylaminopropylamine as amine. After the reaction it was found that 1.8% by weight of the amine had not reacted, so that the reaction product contained 0.11 free epoxy groups per 300 grammes of resin. A portion of 10.5 grammes of the reaction product was diluted with 2 grammes of methylglycol acetate and subsequently 60% of the amino groups present were neutralized with acetic acid. The partly neutralized products is water-reducible, as a result of which an aqueous milk-white composition is obtained.

Example C

The same procedure was employed as in Example B, except that as amine 31 grammes of monoethanolamine were used. The reaction temperature was 187°–192° C. After the reaction it was found that 2.1% by weight of the amine had not reacted, so that the reaction product contained 0.14 free epoxy groups per 280 grammes of resin. A portion of 10.35 grammes of the reaction product was diluted with 2 grammes of methylglycol acetate and the amino groups present were neutralized with acetic acid. The resulting resin completely dissolved in water. When only 60% of the amino groups were neutralized, then an aqueous milkwhite solution was obtained.

Example D

Into a reactor containing 750 grammes of epoxidized 1,2-polybutadiene having an epoxy number of 262 there were charged 105 grammes of diethanolamine and 4 grammes of the adduct of boron trifluoride and dimethylbenzylamine over a period of 30 minutes in a nitrogen atmosphere at a temperature of 80° C. The unmodified polybutadiene had a vinyl content of 1%, a cis-1,4-content of 74% and a trans-1,4-content of 25%, the polybutadiene being epoxidized in a mixture of acetone and ethyl acetate at 70°–80° C. with the aid of peracetic acid. The amination lasted 4 hours at 90° C., the reaction was continued for 30 minutes at 130°–135° C. The resin, which had an amine number of 65.6 and an epoxy number of 164, was diluted with methylglycol acetate to an 80%-solution.

Example E

The procedure of Example D was followed, except that the epoxidized polybutadiene, the amine and the boron trifluoride adduct were used in amounts of 625 grammes, 175 grammes and 3.1 grammes, respectively. The resulting resin had an amine number of 116.9 and an epoxy number 87.7. After the resin had been diluted with methylglycol acetate to an 80%-solution, a portion of 10.45 grammes was neutralized with 70% acetic acid.

Upon subsequent dilution with water a milky, turbid solution was obtained.

EXAMPLE F

The same procedure was used as in Example D, except that the epoxidized polybutadiene, the amine and the boron trifluoride adduct were used in amounts of 600 grammes, 252 grammes and 3 grammes, respectively. The resulting reaction product had an amine number of 158 and an epoxy number of 26.3.

Example G

Into a reactor containing 1000 grammes of epoxidized 1,2-polybutadiene having an epoxy number of 196, there were charged 210 grammes of diethanolamine over a period of 45 minutes in a nitrogen atmosphere at a temperature of 90° C. The unmodified polybutadiene had a vinyl content of 90%, a cis-1,4-content of 1% and a trans-1,4-content of 9%, the polybutadiene being epoxidized in a mixture of formic acid and dichloroethane at 75°–80° C. with the aid of hydrogen peroxide (30% in water). The amination lasted 4 hours at 200° C. After the reaction it was found that 2.5% by weight of the amine had not reacted. The resin, which had an amine number of 92.7 and an epoxy number of 69.5, was after cooling to 90° C. diluted to an 80%-solution with diethylene glycol dimethyl ether.

Example H

The procedure of Example G was followed, except that at the start of the reaction 4.5 grammes of the adduct of boron trifluoride and diethanolamine were added to the reaction mixture and the amination lasted 3 hours at 125°–130° C. and subsequently 30 minutes at 160° C. After the reaction no freely present amine was found. The resin, which had an amine number of 93.1 and an epoxy number of 69.0, was after cooling to 90° C. diluted to an 80%-solution with diethylene glycol dimethyl ether.

Example K

The same procedure was used as in Example B, except that the epoxidized polybutadiene, the amine and the adduct of boron trifluoride and dimethylbenzylamine were used in amounts of 1000 grammes, 183 grammes and 5 grammes, respectively. The amination lasted 6 hours at 160° C. After the reaction it was found that 0.12% by weight of the amine had not reacted. The resin, which had an amine number of 170.2 and an epoxy number of 33.2, was after cooling to 100° C. diluted to an 85%-solution with methylglycol acetate.

Example L

Into a reactor containing 1000 grammes of epoxidized 1,2-polybutadiene having an epoxy number of 143 there were charged 210 grammes of diethanolamine and 5 grammes of the adduct of boron trifluoride and dimethylbenzylamine over a period of 30 minutes in a nitrogen atmosphere at a temperature of 70° C. The unmodified polybutadiene had 1.7 terminal hydroxyl groups per molecule, a vinyl content of 85%, a cis-1,4-content of 3% and a trans-1,4-content of 12%, the epoxidation of the polybutadiene taking place in a mixture of acetone and ethyl acetate at 75°–80° C. with the aid of peracetic acid. The amination lasted 6 hours at 100° C. The resin, which had an amine number of 92.7 and an epoxy number of 25.6, was after cooling to 80° C. diluted to an 80%-solution with methylglycol acetate.

The amino groups in part of this solution were for 30% neutralized with acetic acid, after which the resin displayed excellent solubility in water.

PREPARATION OF AT LEAST PARTIALLY BLOCKED POLYISOCYANATES

Example M

A mixture of 348 grammes of toluene diisocyanate and 145 grammes of methylglycol acetate was heated to 90° C., after which 0.15 grammes of metallic sodium and 232 grammes of diacetone alcohol were added. The temperature was brought to a value of 115° C.–118° C., at which it was kept until the isocyanate content had decreased to 11.6% by weight. There was obtained a solution of toluene diisocyanate partially blocked with diacetone alcohol.

Example N

A mixture of 344 grammes of N,N-dimethyl-aminopropylacetamide and 220 grammes of methylglycol acetate was mixed with 534 grammes of an adduct of 1 molecule of trimethylol propane and 3 molecules of toluene diisocyanate (a triisocyanate having an isocyanate content of 23.6% by weight; marketed by Bayer under the trade name Desmodur L 2291). The temperature of the reaction mixture was brought to a value of 90°–95° C., at which it was kept until the isocyanate content had decreased to 4% by weight. There was obtained a solution of polyisocyanate partially blocked with N,N-dimethylamino-propylacetamide.

Example O 300 grammes of the solution of the partially blocked polyisocyanate according to Example N were reacted with 26 grammes of methylethyl ketoxime at a temperature of 70°–75° C. The reaction was allowed to last until the isocyanate content had decreased to below 0.2% by weight. There was obtained a solution of a completely blocked polyisocyanate.

Example P 360 grammes of an 80% by weight-solution in methylglycol acetate of a toluene diisocyanate partially blocked with ε-caprolactam and having an isocyanate content of 11.7% by weight were mixed with 138 grammes of an 80% by weight-solution of N,N-dimethyl-3-on-1,4-cyclohexadiazinium chloride in N-methyl pyrrolidone. The temperature of the reaction mixture was brought to a value of 50°–70° C., at which it was kept until the isocyanate content had decreased to below 0.2% by weight. There was obtained a water-soluble, completely blocked polyisocyanate.

Example Q 200 grammes of an 80% by weight-solution in methylglycol acetate of a toluene diisocyanate partially blocked with ε-caprolactam and having an isocyanate content of 11.7% by weight were mixed 52 grammes of diacetone alcohol and 12 grammes of methylglycol acetate. The reaction mixture was heated to a temperature of 80°–85° C., after which 0.1 gramme of metallic sodium was added. Next, the temperature was raised to 115°–118° C., at which it was kept until the isocyanate content had practically decreased to zero. There was obtained a solution of a completely blocked polyisocyanate.

Examples 1-4

725 parts by weight of the aminated epoxy polydiene according to Example E were dissolved in 180 parts by weight of methylglycol acetate at 120° C. Subsequently, the solution was cooled to 70° C. and mixed with a solution of 275 parts by weight of the toluene diisocyanate partially blocked with diacetone alcohol according to Example M in 55 parts by weight of methylglycol acetate. The reaction mixture was thereafter kept at 70° C. until there was no longer any free isocyanate. The resulting product was subsequently neutralized at a temperature in the range of 50°-60° C. with 46 parta by weight of acetic acid and gradually diluted with 460 parts by weight of water. In the various preparations of the ready-for-use aqueous coating composition 540 grammes of the above-described aquous product were mixed with, respectively, a solution of 9.5 grammes of copper (II) acetate. $2H_2O$ in 50 ml of water, 4.0 grammes of methylethyl ketoxime and 4.5 grammes of acetyl acetone (Example 1); a solution of 12.9 grammes of cobalt acetate. $4H_2O$ in 50 ml of water, 4.5 grammes of methylethyl ketoxime and 5.0 grammes of acetyl acetone (Example 2); a solution of 14.2 grammes of chromium (III) acetate. $H_2O$ in 50 ml of water, 5.0 grammes of methylethyl ketoxime and 10 grammes of acetyl acetone (Example 3); and a solution of 9.0 grammes of nickel acetate in 50 ml of water, 4.5 grammes of methylethyl ketoxime and 5.0 grammes of acetyl acetone (Example 4).

After the aqueous compositions had been diluted to a solids content of 9.5% by weight, they were subjected to a cataphoresis applying a potential difference of 280 V, the cathode being formed by iron-phosphated tin plate. After cataphoresis for 1.5 minutes at 25° C. the cathode was washed with water, dried and baked for 30 minutes at the baking temperature mentioned in Table 1. On economical grounds these low baking temperatures are very suitable for use in the automobile industry. This is in sharp contrast with other cationic, self-crosslinking compositions, which call for a baking temperature of at least 190° C. and are therefore unacceptable. As follows from Table 1, the baked coating compositions are hard, resistant to solvents and to corrosion.

TABLE 1

|  | Example 1 | Example 2 | Example 3 | Example 4 |
|---|---|---|---|---|
| Resistance to solvents | 100 | 100 | 100 | 100 |
| Hardness | 192 | 210 | 187 | 195 |
| Corrosion resistance after 240 hours | excellent | excellent | excellent | excellent |
| Corrosion resistance after 360 hours | 0.5 mm scribe creepage | only a trace of corrosion | 0.4 mm scribe creepage | excellent |
| Baking temperature (°C.) | 145 | 130 | 135 | 122 |

EXAMPLES 5-9

In these examples 340 grammes of the 80% by weight-solution of the aminated epoxy polybutadiene in methylglycol acetate were mixed with 125 grammes of an 80% by weight-solution in methylglycol acetate of, successively, an isophoron diisocyanate blocked with ε-caprolactam and having an isocyanate content of 10% by weight (Example 5), a toluene diisocyanate blocked with ε-caprolactam and having an isocyanate content of 11.7% by weight (Example 6), a trimethylhexamethylene diisocyanate blocked with ε-caprolactam and having an isocyanate content of 10.4% by weight (Example 7), the completely blocked polyisocyanate according to Example O (Example 8) and finally the completely blocked isocyanate according to Example Q (Example 9). In the Examples 5-7 the reaction mixtures obtained were heated to a temperature of 70°-90° C., at which value they were kept until no longer any free isocyanate could be found. Of the resulting 5 mixtures the amino groups were for 70% neutralized with acetic acid and subsequently slowly diluted with water until aqueous coating compositions having a solids content of 9.3-9.6% by weight were obtained. The compositions prepared were subsequently subjected to a cataphoresis applying a potential difference of 300 V, the cathode being formed by iron-phosphated tin plate. To determine the throwing power of the compsitions use was made of the small cell. After cataphoresis for 1.5 minutes at 25° C. the cathode was washed with water, dried and baked for 25 minutes at 180° C. Subsequently, the maximum throwing power and the 10 μm-throwing power were determined. The values obtained are mentioned in Table 2.

TABLE 2

| Example | Maximum throwing power | 10 μm-throwing power |
|---|---|---|
| 5 | 135 | 105 |
| 6 | 128 | 63 |
| 7 | 118 | 65 |
| 8 | 133 | 83 |
| 9 | 110 | 57 |

EXAMPLE 10-13

In each of these examples 340 parts by weight of an 80% by weight-solution of an aminated epoxy polybutadiene in methylglycol acetate were mixed with 100 parts by weight of an 80% by weight-solution in methylglycol acetate of an isophoron diisocyanate (isocyanate content 10% by weight) blocked with ε-caprolactam. The aminated epoxy polybutadienes used are those of Example D (Example 10), E (Example 11), G (Example 12) and F (Example 13), respectively. The resulting reaction mixtures were heated to a temperature of 70°-90° C., at which value they were kept until no longer any free isocyanate was present. Of the resulting products the resulting amino groups were for 70% neutralized with acetic acid and subsequently slowly diluted with water until aqueous coating compositions having a solids content of 9.6% by weight were obtained. The aqueous compositions were subsequently subjected to a cataphoresis and the coatings deposited were treated and baked as described in the Examples 5-9. Their maximum throwing power and 10 μm-throwing power (using the small cell) are mentioned in Table 3.

TABLE 3

| Example | Maximum throwing power | 10 μm-throwing power |
|---|---|---|
| 10 | 135 | 135 |
| 11 | 135 | 105 |
| 12 | 128 | 60 |
| 13 | 110 | 49 |

Comparative example 1500 parts by weight of the polyglycidyl ether of Bisphenol A having an epoxy equivalent of 500 (marketed by Shell under the trade name Epikote 1001) were dissolved in 454 parts by weight of methylbutyl ketone by heating the mixture to boiling point with stirring, with any water present being removed. Subsequently, 315 parts by weight of diethanolamine were added at a temperature of 80° C. and in a nitrogen atmosphere, after which the reaction mixture was brought to a temperature of 120° C., at which it was kept for 2 hours. After the reaction mixture had been cooled to 80° C., there were added to it 850 parts by weight of an 80% by weight-solution in methylglycol acetate of a partially ε-caprolactam-blocked adduct of 3 molecules of toluene diisocyanate and 3 molecules of trimethylol propane and having an isocyanate content of 4.42% by weight. The resulting mixture was kept at a temperature of 80° C. for 3 hours. The cationic resin thus prepared had an amine number of 67.5 and an epoxy number of 0. Subsequently, the amino groups of the resin were for 80% neutralized with acetic acid and the resin was slowly mixed with soft water until a 10% by weight-aqueous resin solution having a pH of 5.85 was obtained. The resulting composition was cataphoretically deposited on tin plate in the same way as described in the Examples 5–9, which process however was made to last 2 minutes instead of 1.5 minutes. The resin applied was washed with water, and dried and baked for 30 minutes at 200° C. The maximum throwing power was as low as 90 mm.

What is claimed is:

1. A cataphoretically depositable aqueous coating composition based on
   (A) 100 parts by weight of an at least partially neutralized reaction product of an epoxy groups-containing compound and an amine and
   (B) 5–50 parts by weight of an at least partially blocked polyisocyanate,
   in which composition the constituents A and B may be chemically combined, characterized in that the aminated epoxy compound is the reaction product of
   (1) 40–90 parts by weight of an epoxidized (co)polymer having an epoxy number of 50–400 of a (cyclo)alkadiene containing 4–12 carbon atoms, which (co)polymer has a number average molecular weight of 400–12,000, and
   (2) 60–10 parts by weight of a compound having 1–30 carbon atoms and having at least one primary or secondary amino group.

2. The coating composition of claim 1, characterized in that the (co)polymer of a (cyclo)alkadiene having 4–12 carbon atoms is composed of 5–95% by weight of one or more (cyclo)alkadienes and 10–95% by weight of one or more vinyl compounds.

3. The coating composition of claim 1, characterized in that the (cyclo)alkadiene is 1,3-butadiene.

4. The coating composition of claim 1, characterized in that the (cyclo)alkadiene is 1,3-pentadiene.

5. The coating composition of claim 3, characterized in that the polymer of 1,3-butadiene has a cis-1,4-content of at least 60%.

6. The coating composition of claim 3, characterized in that the polymer of 1,3-butadiene has a vinyl content of at least 80%.

7. The coating composition of claim 3, characterized in that the polymer of 1,3-butadiene has a cis-1,4-content of 5–40%, a trans-1,4-content of 20–55% and a vinyl content of 30–55%.

8. The coating composition of claim 1, characterized in that the (co)polymer of a (cyclo)alkadiene has a number average molecular weight of 500–6000.

9. The coating composition of claim 1, characterized in that the epoxidized (co)polymer of a (cyclo)alkadiene has an epoxy number of 50–400.

10. The coating composition of claim 1, characterized in that the epoxidized (co)polymer has an epoxy number of 100–300.

11. The coating composition of claim 1, characterized in that the amine exclusively has primary amino groups.

12. The coating composition of claim 11, characterized in that the primary amine is a monoamine.

13. The coating composition of claim 11, characterized in that the primary amine is a hydroxy amine.

14. The coating composition of claim 1, characterized in that the compound having at least one primary or secondary amino group is a diamine.

15. The coating composition of claim 1, characterized in that the compound having at least one primary or secondary amino group is a polyamine.

16. The coating composition of claim 1, characterized in that at least one of the hydrocarbon groups of the compound having at least one primary or secondary amino group has 8–26 carbon atoms.

17. The coating composition of claim 16, characterized in that the reaction product of the epoxidized (co)polymer of the (cyclo)alkadiene and the amino compound includes 4–30% by weight of the compound having the amino group.

18. The coating composition of claim 1, characterized in that the reaction product of the epoxidized (co)polymer and the amino compound includes 5–65% by weight of an alkylated or non-alkylated phenol having 6–30 carbon atoms.

19. The coating composition of claim 1, characterized in that the reaction product of the epoxidized (co)polymer and the amino group includes 5–65% of a hydroxy compound and/or a thiol compound having 4–30 carbon atoms.

20. The coating composition of claim 1, characterized in that the reaction product of the epoxidized (co)polymer and the amino compound includes 5–65% by weight of a monoepoxy compound or diepoxy compound having 2–220 carbon atoms.

21. The coating composition of claim 1, characterized in that the reaction product of the epoxidized (co)polymer and the amino compound includes 5–65% by weight of a saturated or non-saturated fatty acid having 8–30 carbon atoms.

22. The coating composition of claim 1, characterized in that the at least partially blocked polyisocyanate has one isocyanate group which is chemically combined with the reaction product of the epoxidized (co)polymer and the amino compound.

23. The coating composition of claim 1, characterized in that the at least partially blocked polyisocyanate is blocked with a bifunctional blocking agent of which the second functional group causes the blocked polyisocyanate to be soluble in water.

24. The coating composition of claim 23, characterized in that the second functional group of the blocking agent is a tertiary amino group or a quaternary ammonium group.

25. The coating composition of claim 1, characterized in that the coating composition moreover contains a water-dispersable transition metal compound.

26. The coating composition of claim 25, characterized in that the transition metal compound is chemically combined with an organic complex forming compound.

27. The coating composition of claim 25, characterized in that the transition metal compound is a compound chemically combined with a metal selected from the group of nickel, cobalt, lead, manganese, zinc, chromium, vanadium and iron.

28. A method for the preparation of a cataphoretically depositable aqueous coating composition, characterized in that a (co)polymer of (cyclo)alkadiene having 4–12 carbon atoms is epoxidized to a (co)polymer having an epoxy number of 50–400, and 40–90 parts by weight of the epoxidized (co)polymer are reacted with 60–10 parts by weight of a compound having at least one primary or secondary amino group containing 1–30 carbon atoms, and 100 parts by weight of the resulting reaction product are mixed with or brought into reaction with 5–50 parts by eight of an at least partially blocked polyisocyanate and the resulting product is at least partially neutralized by adding an acid.

* * * * *